United States Patent
De Mello Brandao et al.

(10) Patent No.: US 10,372,987 B2
(45) Date of Patent: Aug. 6, 2019

(54) AGRICULTURAL METHOD AND SYSTEM USING A HIGH RESOLUTION SENSING DEVICE FOR ANALYZING AND SERVICING CROPS

(71) Applicant: INTERNATIONAL BUSINESS MACHINES CORPORATION, Armonk, NY (US)

(72) Inventors: Rafael R. De Mello Brandao, Rio de Janeiro (BR); Marcio F. Moreno, Rio de Janeiro (BR); Igor C. Oliveira, São Paulo (BR); Marcelo N. Dos Santos, Rio de Janeiro (BR); Leonardo P. Tizzei, São Paulo (BR); Bianca Zadrozny, Rio de Janeiro (BR); Maciel Zortea, Rio de Janeiro (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 4 days.

(21) Appl. No.: 15/590,601

(22) Filed: May 9, 2017

(65) Prior Publication Data

US 2018/0325051 A1    Nov. 15, 2018

(51) Int. Cl.
| | |
|---|---|
| *G06K 9/00* | (2006.01) |
| *G06K 9/62* | (2006.01) |
| *A01G 7/00* | (2006.01) |
| *A01B 79/00* | (2006.01) |
| *A01G 25/09* | (2006.01) |

(52) U.S. Cl.
CPC .......... *G06K 9/00657* (2013.01); *A01G 7/00* (2013.01); *G06K 9/6271* (2013.01); *A01B 79/005* (2013.01); *A01G 25/09* (2013.01)

(58) Field of Classification Search
USPC .......... 119/444; 348/89, 135, 157, 159, 373; 382/110; 396/428; 706/12
See application file for complete search history.

(56) References Cited

U.S. PATENT DOCUMENTS

| | | | |
|---|---|---|---|
| 2,024,374 A | 12/1935 | Langebrake | |
| 2,889,948 A | 6/1959 | Leuenberger | |
| 4,612,996 A | 9/1986 | Wolf et al. | |
| 6,014,451 A * | 1/2000 | Berry | G06F 19/3418 382/110 |
| 8,781,174 B2 * | 7/2014 | Tseng | G06K 9/00 348/135 |
| 8,957,969 B2 * | 2/2015 | Anderson | H04N 7/181 348/157 |
| 9,122,130 B1 | 9/2015 | Vegh | |

(Continued)

*Primary Examiner* — Xuemei G Chen
(74) *Attorney, Agent, or Firm* — F. Chau & Associates, LLC (57) ABSTRACT

A system for observing agricultural samples includes a chassis suspended on an elevated cable or rail, an actuator disposed within the chassis for moving the chassis forward and backward along the elevated cable or rail, a camera mounted on or within the chassis and configured to acquire image data of an area below the elevated cable or rail including an agricultural sample, and a processor disposed within the chassis for receiving image data from the camera, autonomously controlling the actuator to move the chassis along the elevated cable or rail, and assessing a condition of the agricultural sample from the received image data.

17 Claims, 6 Drawing Sheets

(56) References Cited

U.S. PATENT DOCUMENTS

| | | | |
|---|---|---|---|
| 9,330,460 B2 * | 5/2016 | Lin | G06T 7/0014 |
| 9,756,773 B1 * | 9/2017 | Barbosa | A01B 79/005 |
| 2007/0188605 A1 * | 8/2007 | Anderson | A01G 25/092 |
| | | | 348/89 |
| 2010/0008661 A1 * | 1/2010 | Wood | G03B 17/561 |
| | | | 396/428 |
| 2010/0026809 A1 * | 2/2010 | Curry | H04N 5/222 |
| | | | 348/157 |
| 2012/0300079 A1 * | 11/2012 | Hale | G01S 3/7864 |
| | | | 348/157 |
| 2014/0218603 A1 * | 8/2014 | Stone | H04N 5/2251 |
| | | | 348/373 |
| 2014/0340487 A1 * | 11/2014 | Gilliland | G01S 7/4863 |
| | | | 348/48 |
| 2015/0320010 A1 * | 11/2015 | Schippers | A01K 1/01 |
| | | | 119/444 |
| 2016/0094793 A1 * | 3/2016 | Westmacott | H04N 5/23296 |
| | | | 348/159 |
| 2016/0124433 A1 | 5/2016 | Cavender-Bares | |
| 2016/0148104 A1 * | 5/2016 | Itzhaky | G06N 5/04 |
| | | | 706/12 |
| 2016/0189007 A1 * | 6/2016 | Wellington | G06T 7/12 |
| | | | 382/110 |
| 2016/0260207 A1 * | 9/2016 | Fryshman | G06T 7/0008 |
| 2017/0006759 A1 * | 1/2017 | Adamchuk | A01B 69/001 |
| 2017/0161560 A1 * | 6/2017 | Itzhaky | A01G 22/00 |
| 2017/0172077 A1 * | 6/2017 | Wouhaybi | A01G 25/167 |
| 2017/0258005 A1 * | 9/2017 | Cutter | A01C 21/005 |
| 2017/0332544 A1 * | 11/2017 | Conrad | A01G 7/00 |
| 2017/0351933 A1 * | 12/2017 | Bleiweiss | G06T 7/408 |
| 2018/0007847 A1 * | 1/2018 | Raj | A01G 25/165 |
| 2018/0046910 A1 * | 2/2018 | Greene | G06Q 10/06 |

* cited by examiner

AGRICULTURAL METHOD AND SYSTEM USING A HIGH RESOLUTION SENSING DEVICE FOR ANALYZING AND SERVICING CROPS

BACKGROUND

The present invention relates to agriculture, and more specifically, to an agricultural method and system using a high resolution sensing device for analyzing and servicing crops.

Agricultural crops are an important source of food. When the crop yield of a given tract of land increases, more of the crop is available for consumption and/or seeding. In addition, when the crop yield increases, the unit cost of the crop may decrease.

Crops may be planted in remote areas and/or in large tracts of land, making inspection of the growth progress of the crops located away from the edge of the tract difficult or costly. Crops may be susceptible to harm by parasites, drought, etc. In some cases, a cause of potential crop loss may be discovered too late to save the plants.

SUMMARY

According to an exemplary embodiment of the present invention, a system for observing agricultural samples includes a chassis suspended on an elevated cable or rail, an actuator disposed within the chassis for moving the chassis forward and backward along the elevated cable or rail, a camera mounted on or within the chassis and configured to acquire image data of an area below the elevated cable or rail including an agricultural sample, and a processor disposed within the chassis for receiving image data from the camera, autonomously controlling the actuator to move the chassis along the elevated cable or rail, and assessing a condition of the agricultural sample from the received image data.

According to an exemplary embodiment of the present invention, a method for observing agricultural samples includes receiving training data including a set of images representing normal agricultural samples annotated as such and abnormal agricultural samples annotated as such, training a classifier to distinguish between images of normal agricultural samples and abnormal agricultural samples based on the received training data, using an autonomous agricultural observation system suspended by an elevated cable or rail to acquire image data of an area below the elevated cable or rail, and using the trained classifier to identify an agricultural abnormality within the image data acquired by the autonomous agricultural observation system.

According to an exemplary embodiment of the present invention, a system for observing agricultural samples includes a chassis suspended on an elevated cable or rail, an actuator disposed within the chassis for moving the chassis forward and backward along the elevated cable or rail, a camera mounted on or within the chassis and configured to acquire image data of an area below the elevated cable or rail including an agricultural sample, and a processor disposed within the chassis for autonomously controlling the actuator and the camera, and using a trained classifier to identify an agricultural abnormality within the acquired image data.

BRIEF DESCRIPTION OF THE DRAWINGS

The above and other features and aspects of the present invention will become more apparent by describing in detail exemplary embodiments thereof with reference to the accompanying drawings, in which.

DETAILED DESCRIPTION

The descriptions of the various exemplary embodiments of the present invention have been presented for purposes of illustration, but are not intended to be exhaustive or limited to the exemplary embodiments disclosed. Many modifications and variations will be apparent to those of ordinary skill in the art without departing from the scope and spirit of the described exemplary embodiments. The terminology used herein was chosen to best explain the principles of the exemplary embodiments, or to enable others of ordinary skill in the art to understand exemplary embodiments described herein.

The elements illustrated in the drawings might not be drawn to scale. Like reference numerals may refer to like elements throughout the specification.

Figure 1:
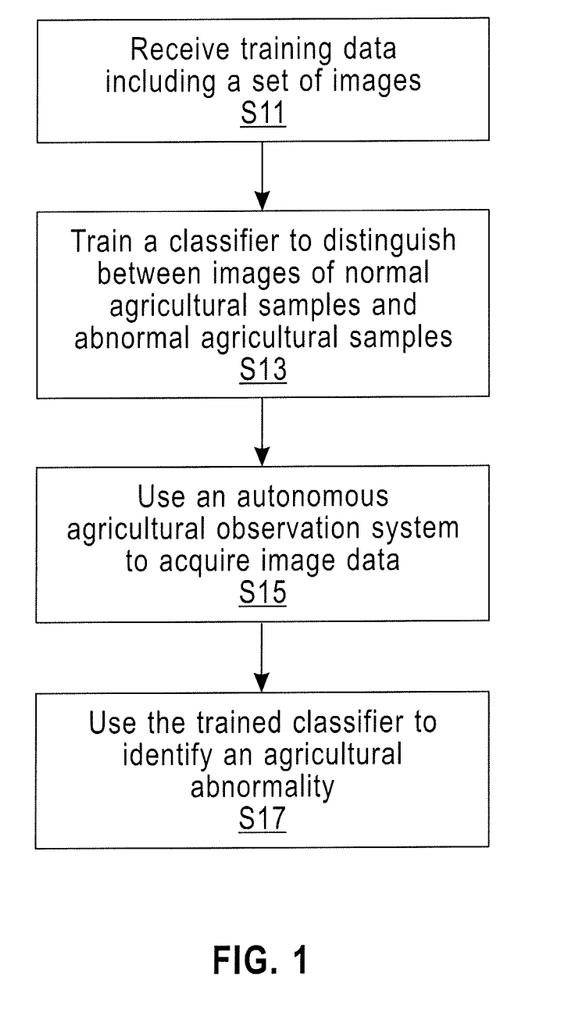
FIG. 1 illustrates a method for observing agricultural samples, according to an exemplary embodiment of the present invention.

FIG. 1 illustrates a method for observing agricultural samples, according to an exemplary embodiment of the present invention.

Referring to FIG. 1 an operation S11 includes receiving training data. The training data may include a set of still images representing normal agricultural samples and a set of still images representing abnormal agricultural samples. In addition, the training data may include video data representing normal agricultural samples and video data representing abnormal agricultural samples. The training data may be received by, for example, a cognitive computer system. The cognitive computer system may be a general-purpose computer with learning capabilities or an equivalent specialized hardware such as a neurosynaptic processor.

The normal agricultural samples may include still images and/or video footage illustrating plants in good condition and soil in good condition. The still images and/or the video footage may be referred to as "images" throughout the specification. The images illustrating normal agricultural samples may be annotated to indicate that the images illustrate plants and/or soil in good conditions.

The abnormal agricultural samples may include images illustrating plants in poor conditions and/or poor soil conditions. The abnormal agricultural samples may be annotated to indicate that the images illustrate plants and/or soil in poor conditions. The annotations of the plants in poor condition may indicate, for example, that a plant is infested by pests, that a plant is suffering from drought (e.g., the plant shows yellowing leaves instead of green leaves), that a plant is malnourished (e.g., a plant smaller than it should be for its age or smaller than adjoining plants), that a plant is diseased when, for example, fungus or rotting is shown on the image, etc. The annotations of the land in poor conditions may indicate that an area of land is, for example, dry, muddy, has no topsoil, is rocky, salty (e.g., unsuitable for growing plants), etc. In addition, each image may be annotated to indicate information such as the pest type (e.g., a caterpillar), type of fungus (e.g., armillaria mellea) etc., illustrated in the image. Each image may also be annotated to indicate the type and age of plants, soil type and conditions, and other environmental factors illustrated in the image.

The images may illustrate the plants and/or soil clearly. In addition, the images may have a resolution high enough such that small pests or small insects (e.g., ants) may be detected on ground and/or plants.

Operation S13 includes training a classifier to distinguish between the images that illustrate normal agricultural samples and the images that illustrate abnormal agricultural samples based on the received training data. In addition to distinguishing between the normal and abnormal agricultural samples, the classifier may be trained to determine the kind of abnormality that is affecting the one or more plants illustrated in an abnormal agricultural sample. For example, the classifier may be trained to determine that the abnormality is pest infestation when insects or pests (e.g., ants, a caterpillar, etc.), harmful to the plant(s) shown in the image, are illustrated in the abnormal agricultural sample. In addition, the classifier may be trained to determine the type of pest illustrated in an image, for example, a caterpillar. The classifier may be trained by using, for example, a cognitive computer system. The classifier may be trained in an autonomous vehicle or elsewhere, and uploaded/installed to the autonomous vehicle.

Operation S15 includes using an autonomous agricultural observation system, suspended by an elevated cable or rail, to acquire image data (e.g., still images and/or video footage) of an area below the elevated cable or rail. The autonomous agricultural observation system may include a plurality of autonomous vehicles suspended on the elevated cables/rails. In an exemplary embodiment of the present invention, the autonomous agricultural observation system includes one autonomous vehicle. In an exemplary embodiment of the present invention, the autonomous agricultural observation system includes two or more autonomous vehicles.

Each autonomous vehicle may include, for example, a computer with a processor and memory, one or more cameras, and a plurality of sensors disposed within/on a chassis of the autonomous vehicle. The chassis may be suspended by (e.g., supported on) a pair of rails or a pair of cables. The chassis may move backward and forward along the entire span of the cables/rails.

The cables/rails may span from a first support point (e.g., a first column, tower, an irrigation system, or other supporting structure) to a second support point. The rails/cables may be elevated from the ground level to an elevation, for example, above the tops of the plants growing underneath the rails/cables. Each of the autonomous vehicles may include an actuator and/or a motor disposed within the chassis such that the chassis may be moved backward and forward on the rails/cables. However, the motor/actuator may also be disposed on an external surface (e.g., externally) of the chassis. Each autonomous vehicle may include a camera that is configured to acquire still images and/or video data of the area below the chassis (e.g., the plants growing underneath the location of the chassis). In addition, each autonomous vehicle may include a plurality of sensors, for example, a global positioning system (GPS) sensor, an acoustic sensor (e.g., a microphone), and other sensors as described below. The acquired images and sensor data may be stored in the memory of the autonomous agricultural observation system.

Operation S15 includes moving the chassis of at least one of the autonomous vehicles along the cables/rails such that the camera of the autonomous vehicle may capture images and sensor data of the plants and/or land located underneath along the entire span of the cables rails. The autonomous vehicle may acquire images and sensor data of the plants and/or land located underneath at predetermined spatial intervals along the cables/rails (e.g., every 6 inches, every foot, every two feet, etc.), or continuously, while the chassis is moving.

The camera is disposed above the plants/ground and points down to acquire images of the plants and/or land underneath it. In addition, the camera may be self-perpendicular-aligning such that it may compensate for an alignment change of the autonomous vehicle due to the sag of the cables/rails. The cables/rails may sag, for example, from the weight of the autonomous vehicle and from the weight of the cables/rail.

In addition, the camera may have zoom functions to magnify an area of interest (e.g., a patch of land and/or plant(s) in poor condition). For example, when the trained classifier detects an abnormality in an acquired image, the autonomous agricultural observation system may send at least one autonomous vehicle back to the location of the plants with the abnormality such that the autonomous vehicle may acquire magnified images of the plant and/or land with the abnormality. The magnified images may be used to identify the type of the abnormality (or more than one type of abnormality) present in the plant(s) and/or land. In addition, the magnification feature of the camera may be used to compensate for the camera's off-from-perpendicular alignment due to the sag of the cables/rails. Further, gimbals may be used to stabilize the camera and to make the camera point in a given direction, for example, for the camera to point down toward the ground. In addition, the gimbals may be used to align the camera to point downward toward the ground to remedy the alignment change of an autonomous agricultural vehicle due to the sag of the cables.

Each autonomous vehicle of the autonomous agricultural observation system may include sensors to acquire sensor data, for example, a GPS location, hyperspectral image data, etc., of the plants and/or land located underneath an autonomous vehicle and/or ambient pressure, humidity readings, etc., of the environment.

The sensor data may be acquired independently of the operation of the camera. Thus, the autonomous agricultural observation system may acquire the sensor data simultaneously with the camera acquiring the images of the plants/land or while the camera is not being used to acquire images.

The images acquired from the camera and the sensor data may be stored in the memory (e.g., the hard disk drive/SSD) of the respective autonomous vehicle of the autonomous agricultural observation system. More than one camera may be used at the same time in each autonomous vehicle. For example, a first camera may acquire still images, a second camera may acquire video footage, the first and second cameras may each acquire still images or the first and second cameras may each acquire video footage of the plants and/or ground located underneath an autonomous vehicle. In this specification, the term camera may refer to one or more cameras. Each of the one or more cameras may acquire still images and/or video footage.

Operation S17 includes using the trained classifier to identify an agricultural abnormality within the image data acquired by the autonomous agricultural observation system. In an exemplary embodiment of the present invention, operation S17 includes analyzing the still images and/or video footage acquired by at least one of the autonomous vehicles without considering the sensor data acquired by the autonomous vehicles to identify an agricultural normality (e.g., plants in good condition) or an agricultural abnormality (e.g., plants in poor condition). In an exemplary embodiment of the present invention, operation S17 includes analyzing the still images and/or video footage and all of the sensor data acquired by at least one of the autonomous vehicles to identify an agricultural normality and/or an agricultural abnormality. In an exemplary embodiment of the present invention, operation S17 includes analyzing the still images and/or video footage and some but not all of the sensor data acquired by at least one of the autonomous vehicles to identify an agricultural normality and/or an agricultural abnormality. In an exemplary embodiment of the present invention, operation S17 includes analyzing some or all of the sensor data acquired by at least one of the autonomous vehicles but not analyzing the still images and/or video footage acquired by the autonomous vehicles to identify an agricultural normality and/or an agricultural abnormality. For example, the images acquired by at least one of the autonomous vehicles and/or the sensor data acquired by at least one of the autonomous vehicles may be analyzed to determined whether an agricultural abnormality exists.

Operation S17 may further include having the trained classifier of at least one of the autonomous vehicles analyze the images acquired by the camera and identify whether each acquired image illustrates a normal agricultural sample (e.g., plant(s) and/or soil in good conditions) or an abnormal agricultural sample (e.g., plant(s) and/or soil in poor conditions). By analyzing the images, the trained classifier may determine that, for example, an acquired first image illustrates a normal agricultural sample and that an acquired second image illustrates an abnormal agricultural sample. When the classifier identifies an abnormal agricultural sample, the classifier may further analyze the image illustrating the abnormal agricultural sample to identify the type of agricultural abnormality (e.g., parasite infestation, fungal growth, drought, dry land, etc.). For example, the trained classifier may determine that the agricultural abnormality is fungus by detecting an image feature having the shape, size, and/or color of a particular type of fungus growing on one or more plants illustrated in the abnormal agricultural sample.

In addition, operation S17 may include analyzing the gathered sensor data to determine whether the plants and/or the land underneath the rails/cables are in a good condition or in a poor condition. For example, the multispectral image data and/or the hyperspectral image data may be used to determine the land cover type and/or the land cover condition, and the presence of a parasite. For example, in a multispectral image and/or in a hyperspectral image, a parasite may appear as a bright colored feature while the plants and soil may appear as dark features.

For example, the ambient humidity data (e.g., dry air), the ambient temperature data (e.g., a hot day), and/or the ambient light measurement (e.g., full sun), may be used to determine that the weather conditions are unfavorable for a particular type of plant. The unfavorable weather conditions may be interpreted as an agricultural abnormality for one or more plants located under the rails/cables.

After acquiring image and/or video data and sensor data covering the ground under the entire stretch of the cables/rails, and determining that an agricultural abnormality does not exist, the autonomous agricultural system may stop moving the one or more autonomous vehicles. The autonomous agricultural system may autonomously start moving the one or more autonomous vehicles again, to acquire still images and/or video footage and sensor data along the entire expansion of the cables to determine the presence of an agricultural abnormality, after a predetermined amount of time (e.g., one hour, four hours, 12 hours, 24 hours, etc.).

When the ground under the entire span of the cables/rails is not covered, the autonomous agricultural system may continue moving the one or more autonomous vehicles to acquire image and/or video data and sensor data of the plants and ground under the entire span of the cables/rails.

When the autonomous agricultural system determines that an agricultural abnormality exists, the autonomous agricultural system may acquire additional still images/video footage or additional sensor data to determine the cause of the agricultural abnormality. The autonomous agricultural system may send one or more autonomous vehicles to the location of agricultural abnormality to acquire, for example, magnified still images and/or magnified video footage, and sensor data from some or all of the available sensors to determine the cause of the agricultural abnormality.

The autonomous agricultural system may be used to remediate the detected agricultural abnormality. For example, the agricultural system may determine to send one or more autonomous vehicles to the location of the agricultural abnormality. The location of the agricultural abnormality may be determined by using the acquired spatial location data. Thus, the one or more autonomous vehicles may issue or receive a travel command and may autonomously travel to the location of the agricultural abnormality.

When the one or more autonomous vehicles arrive at the location of the agricultural abnormality, the one or more autonomous vehicles may deliver a payload to remediate the abnormality. For example, when the detected abnormality is pests, at least one of the one or more autonomous vehicles may, for example, release a pesticide over the plants. When the detected abnormality is unfavorable weather conditions (e.g., too hot or a drought), at least one or more of the autonomous vehicle may, for example, release water over the affected plants and/or land. For example, dry land may be watered. However, it is to be understood that the present system may be used to provide additional water to a particular spot of land as needed, rather than to be used as a general irrigation system.

The remediating elements, or payload, for example, the pesticide, the fertilizer, the water, etc., may be disposed in different compartments/chambers on or within the chassis of each of the one or more autonomous vehicles.

When the autonomous agricultural observation system detects a location of an agricultural abnormality, the method of FIG. 1 may further include sending at least one autonomous vehicle of the autonomous agricultural observation system to the location of agricultural abnormality at a predetermined time period (e.g., every hour, every four hours, every day, etc.) to acquire image data, video data, and/or sensor data. The acquired data may be used to determine whether the agricultural abnormality is cured or is still present or to provide periodic treatment to a given area.

It is understood that sending an autonomous vehicle to a particular location may include the autonomous vehicle traveling forward and/or backward on the rails/cable. In some exemplary embodiments, the autonomous vehicles may be able to transfer themselves from one set of cables to another.

The image data, video data, and/or sensor data acquired by the autonomous vehicle(s) may be used to refine the trained classifier such that the successful agricultural abnormality detection rate is increased and such that the trained classifier may be able to detect additional types of agricultural abnormalities.

For example, when an agricultural abnormality is detected, the method of FIG. 1 may further include transmitting the image/video data and the sensor data that was acquired at the location of the agricultural abnormality to a user that is remotely located. The remote user may analyze the received data and may determine whether the data indicates the presence of an agricultural abnormality. When the user determines that an agricultural abnormality exists, the user may annotate the received data to indicate the type/kind of abnormality. When the user determines that an agricultural abnormality does not exit (e.g., a false detection), the user may annotate the received data to indicate that the agricultural sample is in good condition. The annotated data may be transmitted wirelessly or by wire from the user back to the autonomous agricultural observation system. The classifier of operation S13 may be trained to detect the type of abnormality annotated by the user based on the additional data transmitted from the user.

In addition, the method of FIG. 1 may include receiving additional training data from the user, including annotated still images, annotated video and annotated sensor data (operation S11). The classifier may be trained to detect normal and abnormal agricultural samples based on the initial training data and the additional training data received from the user at a later time (operation S13). The user may transmit additional training data to the autonomous agricultural observation system when the user desires or periodically (e.g., every week, every month, etc.).

The user may also change, overwrite, or create a new set of rules of actions for the autonomous agricultural system to follow when the autonomous agricultural system detects an agricultural abnormality. For example, the user may program the autonomous agricultural system to release a smaller or a greater quantity of water over the plants that are determined to need water, to release a smaller or a greater amount of pesticide, a different type of pesticide, etc., over the plants that are determined to need pesticide, etc.

Thus, operation S15 may be performed by using the classifier, which is trained by using initial data and the additional data received by the user, to detect normal and abnormal agricultural samples.

The autonomous vehicle(s) of the autonomous agricultural observation system of the method of claim 1 may be powered by, for example, solar power and/or electrical power.

The autonomous agricultural observation system of the method of FIG. 1 may autonomously perform the above-referenced operations. Thus, the autonomous agricultural observation system of the method of FIG. 1 may utilize the autonomous vehicle(s) to perform the above-referenced operations without human intervention over long periods of time (e.g., months, seasons, or years).

It is understood that the operations of the method of FIG. 1 may be performed by each of one or more autonomous vehicles of the autonomous agricultural observation system. For example, an autonomous vehicle may receive the training data (operation S11), train the classifier (operation S13), move itself (e.g., move the autonomous vehicle) over the entire span of the cables/rails and acquire still images, video data, and sensor data (e.g., temperature, hyperspectral image data, etc.) while moving on the cables/rails, identify an agricultural abnormality (operation S17), perform the remedial operations on the areas having the agricultural abnormality, revisit the area having the agricultural abnormality, and repeat all above operations at a predetermined time period (e.g., every day, every other day, etc.), autonomously.

Figure 2:
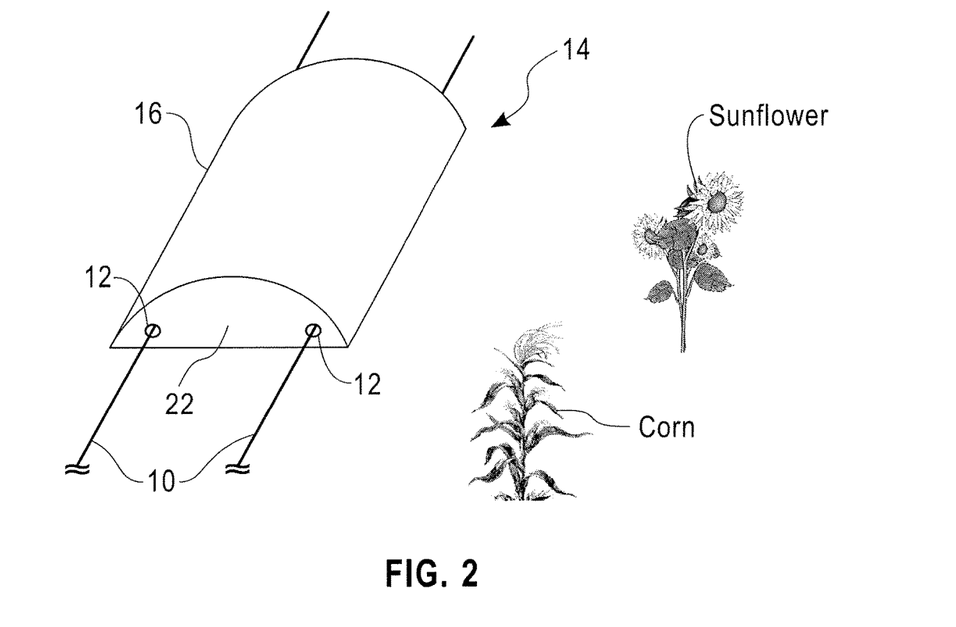
FIG. 2 illustrates a perspective view of an autonomous vehicle included in an autonomous agricultural observation system, according to an exemplary embodiment of the present invention.
Figure 3:
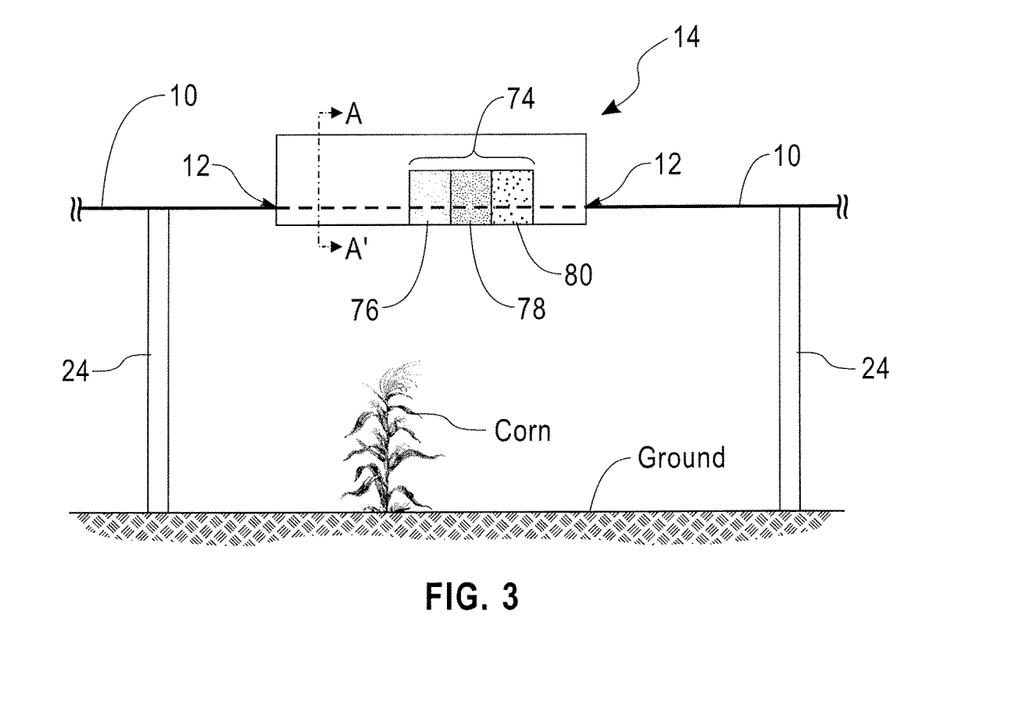
FIG. 3 illustrates a side view of the autonomous vehicle of FIG. 2, according to an exemplary embodiment of the present invention.
Figure 4:
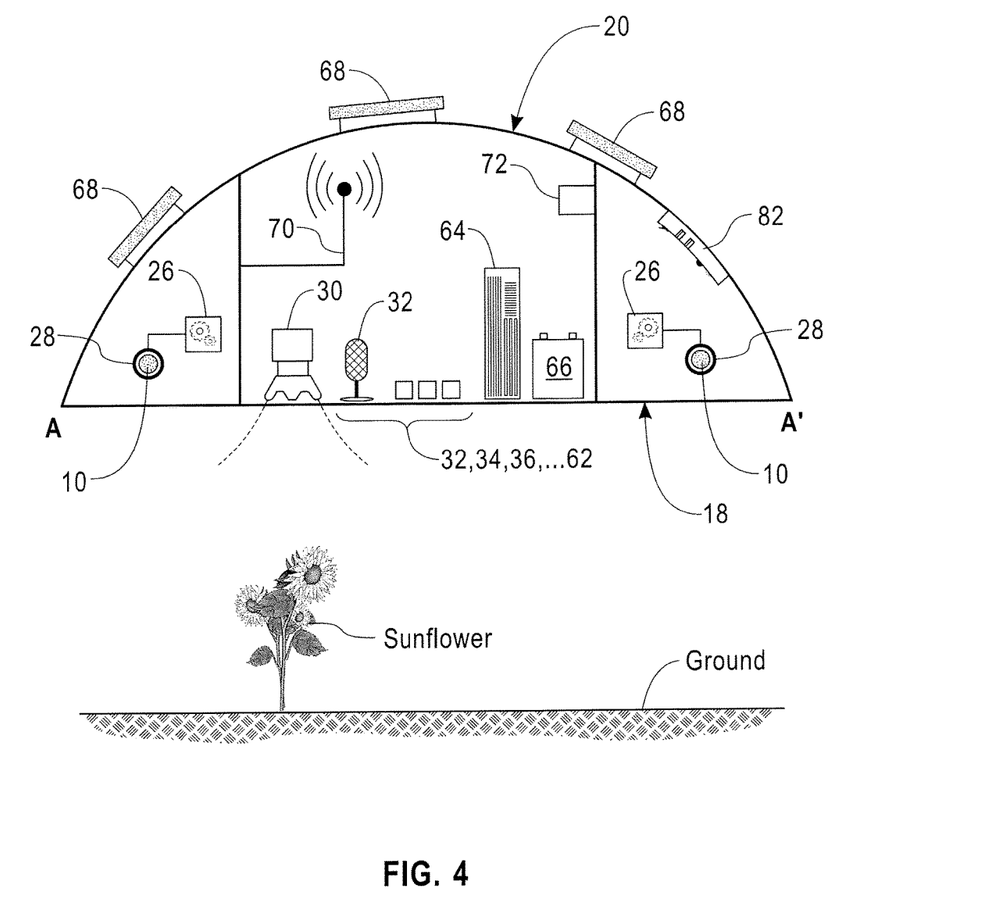
FIG. 4 illustrates a cross-section A-A' of the autonomous vehicle of FIG. 3, according to an exemplary embodiment of the present invention.

FIG. 2 illustrates a perspective view of an autonomous vehicle included in an autonomous agricultural observation system, according to an exemplary embodiment of the present invention. FIG. 3 illustrates a side view of the autonomous vehicle of FIG. 2, according to an exemplary embodiment of the present invention. FIG. 4 illustrates a cross-section A-A' of the autonomous vehicle of FIG. 3, according to an exemplary embodiment of the present invention.

Referring to FIGS. 2 to 4, an autonomous agricultural observation system includes an autonomous vehicle 14. In an exemplary embodiment of the present invention, an autonomous agricultural observation system includes a plurality of autonomous vehicles 14. The autonomous agricultural observation system of FIGS. 2 to 4 may perform the operations of the method of FIG. 1.

The autonomous vehicle 14 may include a chassis 16. The chassis 16 may include a bottom part 18, a top part 20, and a pair of side parts 22. The bottom part 18 may be polygonal (e.g., rectangular). The top part 20 may be curved. The side parts 22 may be planar or curved. For example, the side parts 22 may each have a shape similar to the shape of the top part 20, an oval shape, a teardrop shape, etc. However, the chassis 16 may include a shape or configuration other than that shown in FIGS. 2 to 4 such that the autonomous vehicle 14 may experience reduced wind drag.

For example, the autonomous vehicle 14 illustrated in FIGS. 2 to 4 experiences a small degree of movement of the chassis 16 from the wind in a direction that crosses the direction in which the cables 10 extend due to the curved shape of the chassis 16. It is understood that the chassis 16 may have a curved or aerodynamic shape other than that shown in FIGS. 2 and 3. For example, the chassis 16 may have an oval shape, a teardrop shape, etc.

The chassis 16 may include lightweight materials, for example, aluminum, aluminum alloy, composite synthetic fiber, plastics, etc.

The chassis 16 may be suspended on a pair of cables or rails 10. However, the chassis 16 may also be suspended on more than two cables/rails 10. Hereinafter, the cables or rails 10 may be referred to as the cables 10. The chassis 16 is supported on more than one cable 10 to have increased stability and increased resistance to wind, rain, etc., and because the chassis 16 may better maintain its predetermined horizontal alignment under inclement weather and/or while moving on the cables 10.

The chassis 16 may enclose at least one of the cables 10 for increased stability against wind forces, rain, etc. As shown in FIGS. 2 to 4, each of the cables 10 passes through the chassis 16. The side parts 22 may have openings 12 such that the cables 10 may pass through the chassis 16 and such that a disconnection between the chassis 16 and the cables 10 may be prevented from wind or other factors external to the chassis 16. For example, when the cables 10 pass through the openings 12, the autonomous vehicle 14 might not be derailed from the cables 10.

The cables 10 may be elevated over the ground and may be supported by the supporting structures 24. The cables 10 may be substantially parallel to each other. The elevation of the cables 10 may be sufficiently high to maintain a predetermined vertical distance (e.g., 2 feet, 3 feet, 10 feet, etc.) between the top of the plants and the bottom part 18 or between the ground and the bottom part 18. The supporting structures 24 may be poles, irrigation system structures (e.g., a pivot irrigation system), natural features (e.g., a tree, a rock, etc), etc.

The autonomous vehicle 14 may include one or more actuators 26. An actuator 26 may be, for example, an actuator, an electric motor, an internal combustion motor, etc. The one or more actuators 26 may be used to move the autonomous vehicle 14 on the pair of cables 10 by using, for example, pulleys/sheaves 28 contacting the cables 10, or hooks, legs, or other suitable mechanisms in contact with the cables 10. In FIG. 4, the vertical walls separating the actuators 26 from the other components of the autonomous vehicle 14 are merely exemplary. For example, the vertical walls may be omitted. In an exemplary embodiment of the present invention, the actuator(s) 26 may be disposed within the chassis 16.

In an exemplary embodiment of the present invention, the autonomous agricultural observation system includes 4 or more cables 10. In this case, a first chassis 16 may be supported by a first cable 10 and a second cable 10. A first actuator 26 may be attached to a first supporting structure 24 or to another fixed point. A third cable 10 may be connected to the first actuator 26 and to the first chassis 16 to pull the first chassis 16 on the first and second cables 10 in a first direction. In addition, a second actuator 26 may be attached to a second supporting structure 24 or to a fixed point different from that of the first actuator 26. A fourth cable 10 may be coupled to the second actuator 26 and to the first chassis 16 to pull the first chassis 16 in a second direction opposite to the first direction.

The actuator(s) 26 may accelerate, decelerate and move the autonomous vehicle 14 at a predetermined speed (e.g., at a constant speed), backward and forward, on the cables 10. The predetermined speed may be a speed (e.g., 1 foot per second, 2 feet per second, 10 feet per second, etc.) that is suitable for acquiring high quality and high definition still images, video footage and sensor data of the ground and plants underneath the autonomous vehicle 14. For example, the autonomous vehicle 14 may travel at a slow speed.

Since the weight of the autonomous vehicle 14 is supported by the cables 10, the actuator(s) 26 need not spend energy to keep the autonomous vehicle suspended over the plants. Thus, the autonomous vehicle 14 may consume little power to operate.

The autonomous vehicle 14 may have brakes to prevent it from being pushed by the wind or from moving due to the sag the cables 10 while the autonomous vehicle 14 is stationary and performing tasks (e.g., acquiring images of the plants and/or soil located underneath, watering the plants/soil, etc.) or while the autonomous vehicle 14 is stationary and idle. In addition, the actuator(s) 26 may be used as brakes or may be powered off when the autonomous vehicle 14 is stationary to reduce energy consumption.

The autonomous vehicle 14 may include one or more cameras/video cameras 30. The autonomous vehicle 14 may include one or more acoustic sensors 32, temperature sensors 34, humidity sensors 36, pressure sensors (e.g., a barometer) 38, multispectral sensors 40, hyperspectral sensors 42, infrared sensors 44, laser sensors 46, spatial location sensors (e.g., GPS sensors 48, GLONASS and/or Galileo global navigation satellite system sensors 50, temporal sensors 52, ambient light sensors 54, accelerometers 56, proximity sensors 58, gyroscopic sensors 60, gimbals 62, etc. It is understood that the locations of the sensors 32 to 62 illustrated in FIG. 4 are merely exemplary. The sensors 32 to 62 may be disposed in various locations within the chassis 16, or on the exterior surface of the chassis 16. The spatial sensors may also include sensors that use beacons to accurately determine the location of the chassis 16. For example, the beacon sensor may detect beacons that are located in a plot of land to accurately determine the location of the chassis 16 or to increase the accuracy of the determination of the location of the chassis 16.

The camera 30 may be used to acquire the still images and/or video footage and the sensors 32 to 62 may be used to acquire the sensor data (e.g., GPS location, temperature, etc.) referred to in operation S15 of the method of FIG. 1.

A computer 64 may include a processor, memory (e.g., random access memory (RAM), a hard disk drive, a solid state disk (SSD) and/or another form of flash memory) and other circuitry that is used to operate the autonomous vehicle 14. For example, the still images and/or video footage acquired by using the camera 30, and the sensor data acquired by using the sensors 32 to 62, may be stored in the memory of the computer 64. In addition, a program including instructions to perform the method operations of the method of FIG. 1 may be stored in the memory of the computer 64. The processor may execute the program to detect the presence of normal and abnormal agricultural samples.

Thus, the processor may autonomously control the camera 30 and the sensors 32 to 62 to receive still images and/or video footage and sensor data. The processor may autonomously control the actuator(s) 26 to move the chassis along the cables 10 at different speeds, to change the direction of travel, etc. The processor may autonomously assess the condition of the plants and/or soil located underneath the cables 10 by analyzing the still images and/or video footage acquired by using the camera 30 and the sensor data acquired by using the sensors 32 to 62. The processor may autonomously command the autonomous vehicle 14 to keep acquiring image data and sensor data until the autonomous vehicle 14 covers the ground under the entire span of the cables 10. The processor may autonomously control the actuator(s) 26 to return the autonomous vehicle 14 to a location of a detected abnormal agricultural sample for acquiring additional still images, video footage and sensor data. The processor may be configured to use the acquired additional still images, video footage and sensor data to refine the trained classifier. The processor may command the autonomous vehicle 14 to deliver a payload (e.g., water, fertilizer, etc.) to the location of the detected abnormal agricultural sample. In addition, the processor may autonomously repeat the above-referenced operations at predetermined time intervals.

The autonomous vehicle 14 may include a rechargeable power supply 66 (e.g., a rechargeable battery 66) supplying power to the autonomous vehicle 14. Accordingly, the rechargeable power supply 66 may supply power for the operation of the computer 64, the camera(s) 30, the sensors 32 to 62, the actuator(s) 26, and other components of the autonomous vehicle 14.

One or more solar cells 68 may be included on the top part 20 to supply power to the rechargeable power supply 66. The solar cells 68 may transform ambient light (e.g., sunlight) into electricity to charge the rechargeable power supply 66. The number, size and arrangement of the solar cells 68 may vary. For example, the solar cells 68 may cover the top part 20. In addition to solar power, or alternatively to solar power, the autonomous vehicle 14 may be powered by other types of energy, for example, wind power. In the case of wind power, a wind turbine including one or more rotors and rotor blades may be disposed on an external surface of the chassis 16. The rotor and the rotor blades may be mounted, for example, on a shaft that is attached to the chassis 16. When using wind turbines to generate power, one turbine may be used, and the one turbine may be disposed at or near the center of mass of the chassis 16 to reduce rotation or twisting of the cables 10 from the operation of the turbine, or a pair of turbines may be disposed at about equal distances from the center of mass of the chassis 16.

The cables 10 may also be used to supply power to the autonomous vehicle 14. In addition, the autonomous vehicle 14 may include a generator (e.g., an internal combustion generator) disposed within the chassis 16 or on the exterior surface of the chassis 16.

A radio transponder 70 (e.g., a transceiver 70) may be included within the chassis 16 or on the exterior surface of the chassis 16. The autonomous vehicle 14 may use the radio transponder 70 to transmit data (e.g., the image and/or sensor data including a detected agricultural abnormality) to a control station and to receive data (e.g., image data and/or sensor data annotated to indicate whether an agricultural abnormality is present in the image and/or sensor data and if so, the type of abnormality) from the control station directly or via the Internet. A user may use the control station as an interface of communication with the autonomous vehicle 14. In addition, the radio transponder 70 may be used to receive missions/tasks to perform or other commands from the control station.

In addition, when an autonomous agricultural observation system includes two or more autonomous vehicles 14, a first autonomous vehicle 14 may transmit data to and receive data from a second autonomous vehicle, and transmit data to and receive data from the control station. Thus, each autonomous vehicle 14 of a plurality of autonomous vehicles 14 of an autonomous agricultural observation system may be communicatively coupled with each other and with the control station.

The radio transponder 70 may be, for example, a radio frequency transceiver, a BLUETOOTH transceiver, an ad-hoc wi-fi transceiver, a cellular network band transceiver, for example, a 4G long term evolution (LTE) transceiver or the like, etc. For example, the transponder 70 may be connected to local or remote networks such as the Internet, private/public clouds, etc. to send and transmit data. When using a BLUETOOTH transceiver or a radio frequency transceiver, each autonomous vehicle 14 of a plurality of autonomous vehicles 14 of an autonomous agricultural observation system may directly communicate with each other and with the control station In addition, a first autonomous vehicle 14 may be communicatively coupled with a second autonomous vehicle 14 and with the control station via a wired connection by using hardware 72. For example, the hardware 72 of a first autonomous vehicle 14 may transmit data to a second autonomous vehicle 14 and the control station, and the hardware 72 of the first autonomous vehicle 14 may receive data from the second autonomous vehicle 14 and from the control station.

Thus, the cables 10 may support the weight of the autonomous vehicle(s) 14, transmit power to the autonomous vehicle(s) 14 and transmit data to and from each autonomous vehicle 14.

Each of the autonomous vehicles 14 may include a payload compartment 74. The payload compartment 74 may include, for example, a water reservoir 76, a pesticide chamber 78 and a fertilizer chamber 80. It is understood that the location of the payload compartment 74 within the chassis 16 may vary. In addition, the payload compartment 74 may be disposed, for example, on an exterior area of the autonomous vehicle 14. For example, the payload compartment 74 may be disposed on an exterior surface of the top part 20 (e.g., above the chassis 16), on an exterior surface of the bottom part 18 (e.g., below the chassis 16), etc. Although the payload compartment 74 of FIG. 3 includes 3 chambers, it is understood that the payload compartment 74 may include less than 3 chambers, or more than 3 chambers.

The water reservoir 76 may be filled with water. The autonomous vehicle 14 may release the water from the reservoir 76 over the plants by using, for example, a sprinkler, a nozzle, etc. The computer 64 may autonomously control the release of the water over the plants.

The pesticide chamber 78 may be filled with pesticide. The autonomous vehicle 14 may release the pesticide from the pesticide chamber 78 over the plants by using, for example, a nozzle, a release gate, a chute with a release gate, etc. The computer 64 may autonomously control the release of the pesticide over the plants.

The fertilizer chamber 80 may be filled with fertilizer. The autonomous vehicle 14 may release the fertilizer from the fertilizer chamber 80 over the plants by using, for example, a nozzle, a release gate, a chute with a release gate, etc. The computer 64 may autonomously control the release of the fertilizer over the plants.

Each autonomous vehicle 14 may include a plurality of pesticide chambers 78 with different types of pesticide and a plurality of fertilizer chambers 80 with different types of fertilizer.

Each autonomous vehicle 14 may include a control panel 82 (see FIG. 4). The control panel 14 may include a power on/off switch for the autonomous vehicle 14, input/output terminals (e.g., universal series bus (USB) ports, etc.) for transmitting data to and receiving data from the computer 64, and a plurality of lights configured to blink when a component of the autonomous vehicle 14 is operating (e.g., when the camera 30 is acquiring images, when the autonomous vehicle 14 is moving, etc.).

The camera 30, the sensors 32 to 62, the computer 64, the rechargeable power supply 66, the radio transponder 70, the hardware 72, the actuators 26, etc., may be protected from the external environmental conditions (e.g., hail, sun, wind, dust, frost, etc.) when they are disposed within the chassis 16.

Figure 5:
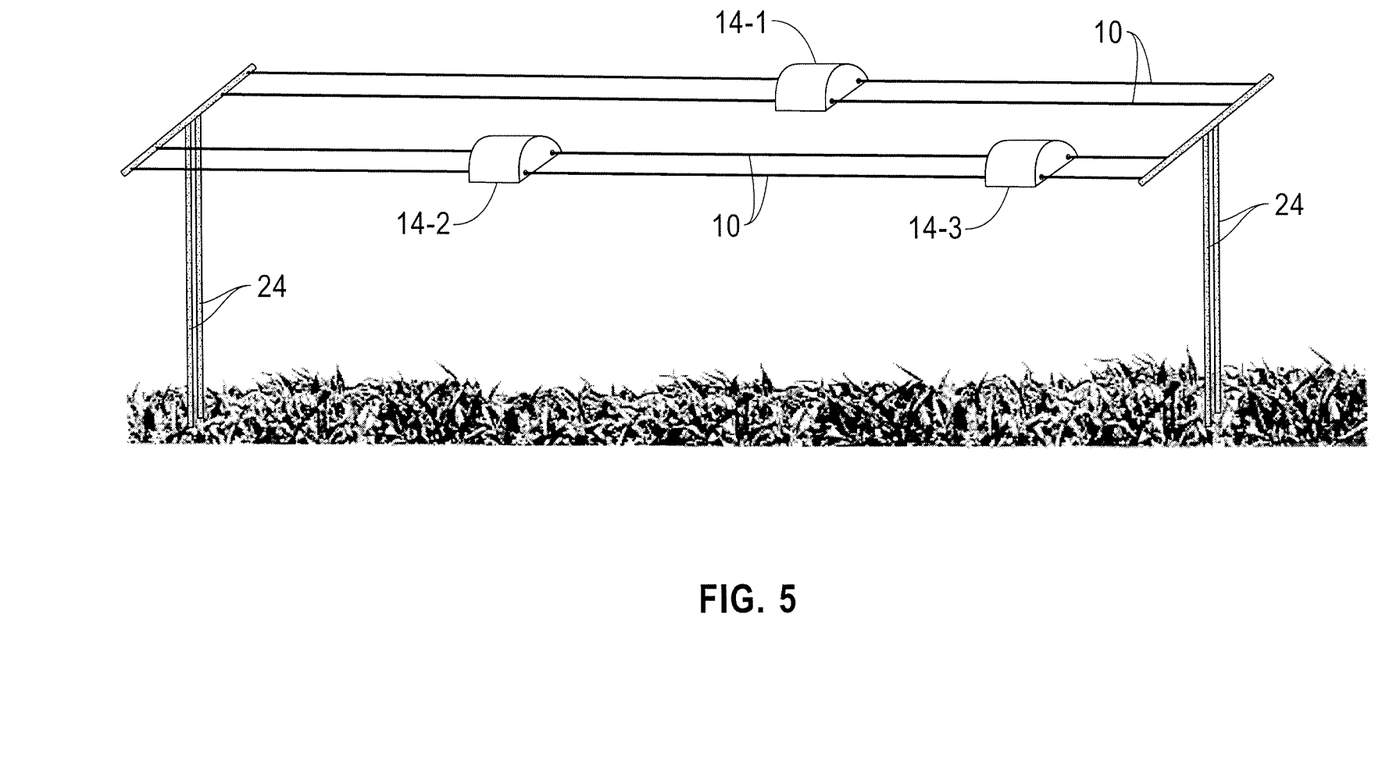
FIG. 5 illustrates a perspective view of an autonomous agricultural observation system, according to an exemplary embodiment of the present invention.

FIG. 5 illustrates a perspective view of an autonomous agricultural observation system, according to an exemplary embodiment of the present invention. The autonomous agricultural observation system of FIG. 5 may perform the operations of the method of FIG. 1.

Referring to FIG. 5, an autonomous agricultural observation system may include a plurality of autonomous vehicles 14_1, 14_2, and 14_3 to 14n (e.g., n is a positive integer). The autonomous vehicle 14_1 may move back and forth on a first pair of cables 10 and the autonomous vehicles 14_2 and 14_3 may move back and forth on a second pair of cables 10. The autonomous vehicles 14_2 and 14_3 may avoid bumping into each other by receiving and analyzing each other's speed, direction of travel, and current location in real-time.

Each of the autonomous vehicles 14_1 to 14n may include the components illustrated with reference to FIGS. 2 to 4.

However, when more than one autonomous vehicles 14 are disposed on the same pair of cables 10, like in the case of the autonomous vehicles 14_2 and 14_3, one or more of the autonomous vehicles 14_1 to 14_n might not include all of the components illustrated with reference to FIGS. 2 to 4 to avoid redundancy.

For example, the autonomous vehicle 14_2 might exclude the payload compartment 74 and the autonomous vehicle 14_3 might exclude at least one or more components from among the camera 30 and the sensors 32 to 62. Thus, in an exemplary embodiment of the present invention, the autonomous vehicle 14_2 may use its camera 30 and sensors 32 to 62 to detect an agricultural abnormality and transmit the detected abnormality type, location of the abnormality and remedial actions to be performed to the autonomous vehicle 14_3. The autonomous vehicle 14_3 may travel to the location of the abnormality and perform the remedial action (e.g., water the plants, release pesticide over the plants, etc.). It is understood that more than three autonomous vehicles 14 may be allocated to the same pair of cables 10.

In an exemplary embodiment of the present invention, each of the two or more autonomous vehicles 14_1 to 14_n that travel along the same pair of cables 10 may include all of the components illustrated with reference to FIGS. 2 to 4. Thus, when one of the autonomous vehicles 14_1 to 14_n becomes inoperative, the other autonomous vehicle(s) 14_1 to 14_n may continue operation on the same pair of cables 10.

Figure 6:
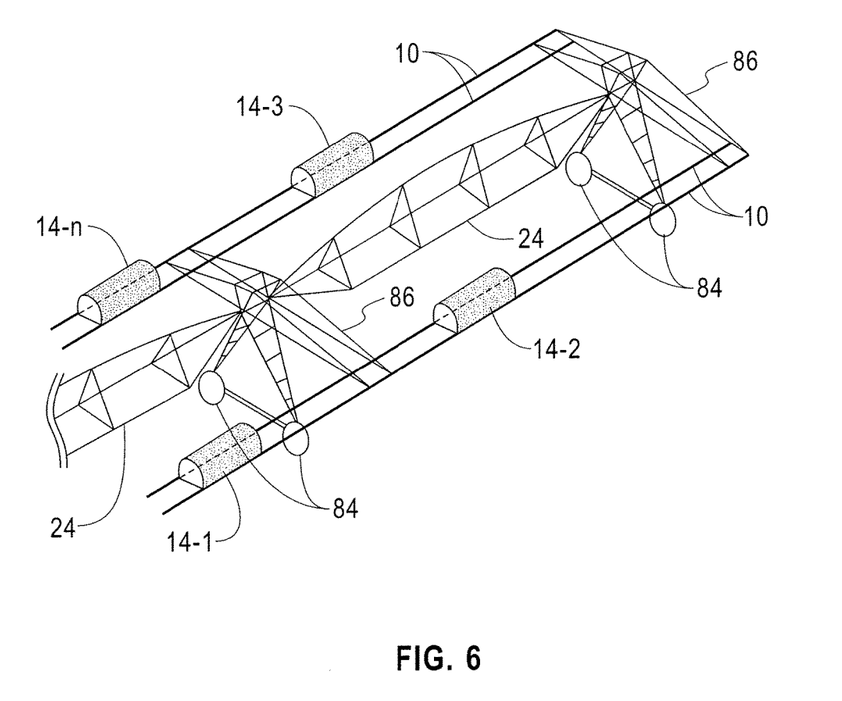
FIG. 6 illustrates a perspective view of an autonomous agricultural observation system, according to an exemplary embodiment of the present invention.

FIG. 6 illustrates a perspective view of an autonomous agricultural observation system, according to an exemplary embodiment of the present invention. The autonomous agricultural observation system of FIG. 6 may perform the operations of the method of FIG. 1.

Referring to FIG. 6, an autonomous agricultural observation system may include a plurality of autonomous vehicles 14_1 to 14n (e.g., n is a positive integer). The supporting structure 24, on which the cables 10 are supported, may be an existing irrigation system. The irrigation system may be, for example, a center pivot irrigation system, a linear-traveling irrigation system, etc. The irrigation system may include a plurality of joined wheeled tower sections having wheels 84 for traveling over a plot of land.

The cables 10 shown in FIG. 6 span continuously between overhanging members 86 of the supporting structure 24. For example, the wheeled tower sections of the supporting structure 24 may be joined with each other at overhanging members 86. The autonomous vehicles 14_1 to 14_n may move on the cables 10 to pass over or under the overhanging members 86, except for the overhanging members 86 at each end of the supporting structure 24. For example, stop plates or stop barriers may be installed at each end of the supporting structure 24 such that the autonomous vehicles 14_1 to 14_n may be prevented from falling off from the supporting structure 24. Thus, the autonomous vehicles 14_1 to 14_n may traverse the overhanging members 86 to travel throughout the entire span of the joined wheeled tower sections of the supporting structure 24. In addition, the usage of joined wheeled tower sections for supporting the cables 10 may be cost efficient and may increase the area of land that may be surveyed and serviced by the autonomous vehicle(s) 14_1 to 14_n.

In an exemplary embodiment of the present invention, the cables 10 may also be arranged in a form of a mesh or a net, where the cables 10 cross each other. The autonomous vehicles 14_1 to 14_n may be configured to travel or pass through joints or intersection where the cables 10 cross each other.

According to an approach, an aerial vehicle that collects information about a crop field may be expensive to operate and may need a human operator to guide its flight. In addition, an aerial vehicle consumes a high amount of energy due to the fact that it must support its own weight during flight. The wind generated from an aerial vehicle may negatively affect the crops. In addition, repeated flights to collect information about a planted field may be cost-prohibitive, and the quality and resolution of the acquired images may be low due to the high altitude, high speed, and or wind turbulence caused by the aerial vehicle.

The autonomous agricultural observation systems of FIGS. 2 to 7 may have reduced energy consumption due to the fact that the actuator(s)/motor(s) 26 of the autonomous vehicle(s) 14_1 to 14_n do not support the weight of the autonomous vehicle(s) 14_1 to 14_n. In addition, the autonomous agricultural observation system can accurately and frequently monitor the condition of the plants underneath the cables 10 by autonomously sending the autonomous vehicle(s) 14_1 to 14_n to any location covered by the network of cables 10. The autonomous vehicle(s) 14_1 to 14_n may also perform remediating acts, for example, watering the plants, fertilizing the plants, releasing pesticide over the plants, etc., autonomously and frequently, due to the fact that they may easily and repeatedly travel to the location of the plants that may need water, fertilizer, pesticide, etc.

Thus, the autonomous agricultural observation systems of FIGS. 2 to 7 may collect frequent and accurate plant growth data at a low cost. The autonomous agricultural observation systems of FIGS. 2 to 7 may also service the plants (e.g., water the plans, fertilize the plants, etc.) at frequent intervals and at a reduced cost. In addition, the autonomous agricultural observation systems of FIGS. 2 to 7 may autonomously perform the above-recited operations without human intervention or with limited human intervention over periods of months or years.

Figure 7:
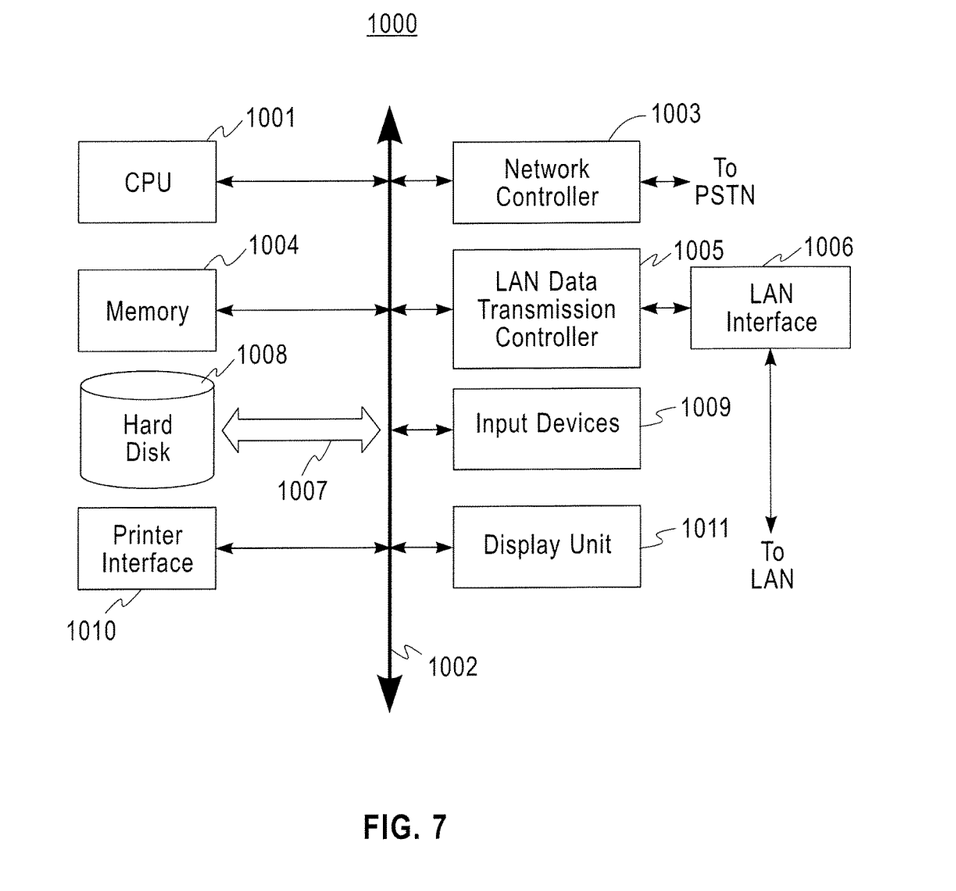
FIG. 7 shows an example of a computer system which may implement a method and system of the present invention.

FIG. 7 shows an example of a computer system which may implement a method and system of the present invention. The system and method of the present invention may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for observing agricultural samples, comprising:
   a chassis suspended on an elevated cable or rail;
   an actuator disposed within the chassis and configured to move the chassis forward and backward along the elevated cable or rail;
   a camera mounted on or within the chassis and configured to acquire image data of an area below the elevated cable or rail including an agricultural sample; and
   a processor disposed within the chassis and configured to receive image data from the camera, to detect an anomaly within the agricultural sample from the received image data, and to autonomously control the actuator to move the chassis along the elevated cable or rail to acquire additional data about the detected anomaly using one or more additional sensors.

2. The system of claim 1, wherein the chassis includes at least a first opening through which the elevated cable or rail enters the chassis and at least a second opening through which the elevated cable or rail exits the chassis such that a portion of the elevated cable or rail is fully enclosed by the chassis, and wherein the chassis further includes at least a third opening through which a second elevated cable or rail enters the chassis and at least a fourth opening through which the second elevated cable or rail exits the chassis such that a portion of the second elevated cable or rail is fully enclosed by the chassis.

3. The system of claim 1, wherein solar cells are disposed on the chassis, the chassis additionally comprises a rechargeable power supply for powering the actuator, camera, and processor, and the rechargeable power supply is recharged using power generated from the solar cells.

4. The system of claim 1, wherein the one or more additional sensors are disposed within or on the chassis for acquiring additional information about the agricultural sample or information about an environment of the agricultural sample.

5. The system of claim 1, wherein the one or more additional sensors includes a temperature sensor, a humidity sensor, a pressure sensor, multispectral sensors, hyperspectral sensors, acoustic sensors, laser sensors, spatial location sensors, temporal sensors, ambient light sensors, accelerometers, proximity sensors, or gyroscopic sensors.

6. The system of claim 1, additionally comprising a payload compartment and applicator for delivering contents of the payload compartment to the agricultural sample, autonomously, on the command of the processor.

7. The system of claim 1, additionally comprising a radio transponder for relaying data to a control station or user either directly or over the Internet.

8. A method for observing agricultural samples, comprising:
   receiving training data including a set of images representing normal agricultural samples annotated as such and abnormal agricultural samples annotated as such;
   training a classifier to distinguish between images of normal agricultural samples and abnormal agricultural samples based on the received training data;
   using an autonomous agricultural observation system suspended by an elevated cable or rail to acquire image data of an area below the elevated cable or rail, wherein at least a portion of the autonomous agricultural observation system is autonomously controlled based at least in part on the image data; and
   using the trained classifier to identify an agricultural abnormality within the image data acquired by the autonomous agricultural observation system;
   sending one or more autonomous vehicles of the autonomous agricultural observation system to acquire additional sensor data to help determine a cause of the identified agricultural abnormality.

9. The method of claim 8, further comprising:
   using the image data acquired by the autonomous agricultural observation system to refine the trained classifier.

10. The method of claim 8, wherein using the autonomous agricultural observation system suspended by an elevated cable or rail to acquire the image data of the area below the elevated cable or rail includes controlling the autonomous agricultural observation system to move forward and backward along the elevated cable or rail and capturing image data at multiple locations.

11. The method of claim 8, wherein the autonomous agricultural observation system delivers a payload to remediate the identified agricultural abnormality.

12. The method of claim 8, wherein the autonomous agricultural observation system is charged from solar power or from wind power.

13. A system for observing agricultural samples, comprising:
   a chassis suspended on an elevated cable or rail;
   an actuator disposed within the chassis for moving the chassis forward and backward along the elevated cable or rail;
   a camera mounted on or within the chassis and configured to acquire image data of an area below the elevated cable or rail including an agricultural sample; and
   a processor disposed within the chassis for autonomously controlling the actuator and the camera based at least in part on the image data, and using a trained classifier to identify an agricultural abnormality within the acquired image data, wherein the processor is configured to control the actuator to autonomously transfer the chassis from a first elevated cable or rail to a second elevated cable or rail.

14. The system of claim 13, wherein the processor is configured to use the acquired image data to refine the trained classifier.

15. The system of claim 13, wherein the processor is configured to control the actuator to move the chassis and camera to acquire the image data at multiple locations.

16. The system of claim 13, wherein the processor is configured to control additional sensors disposed within the chassis to help determine a cause of the identified agricultural abnormality.

17. The system of claim 13, wherein the processor is configured to deliver a payload to remediate the identified agricultural abnormality.

* * * * *